W. M. BANCROFT.
BEARING.
APPLICATION FILED NOV. 16, 1912.

1,095,067.

Patented Apr. 28, 1914.

WITNESSES:
Albert A. Hofmann
Hugo W. Kreinbring.

INVENTOR
W. M. Bancroft.
BY
Edward N. Pagelsen,
ATTORNEY

COLUMBIA PLANOGRAPH CO., WASHINGTON, D. C.

UNITED STATES PATENT OFFICE.

WILLIAM M. BANCROFT, OF NEW ORLEANS, LOUISIANA.

BEARING.

1,095,067.  Specification of Letters Patent.  Patented Apr. 28, 1914.

Application filed November 16, 1912. Serial No. 731,767.

*To all whom it may concern:*

Be it known that I, WILLIAM M. BANCROFT, a citizen of the United States, and a resident of New Orleans, in the parish of Orleans and State of Louisiana, have invented a new and useful Bearing, of which the following is a specification.

This invention relates to the upper bearings for heavy duty shafts, especially for the bearings of the upper rolls of mills for crushing sugar-cane, and its object is to provide means for insuring the lubrication of such bearings and of the journals therein.

Figure 1:
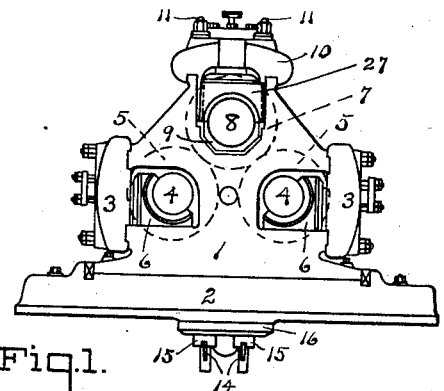
Figure 2:
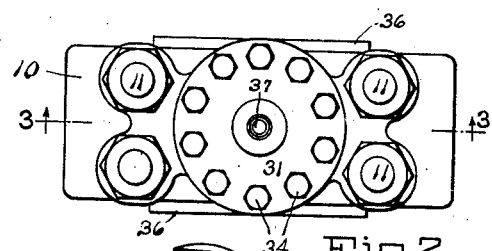
Figure 3:
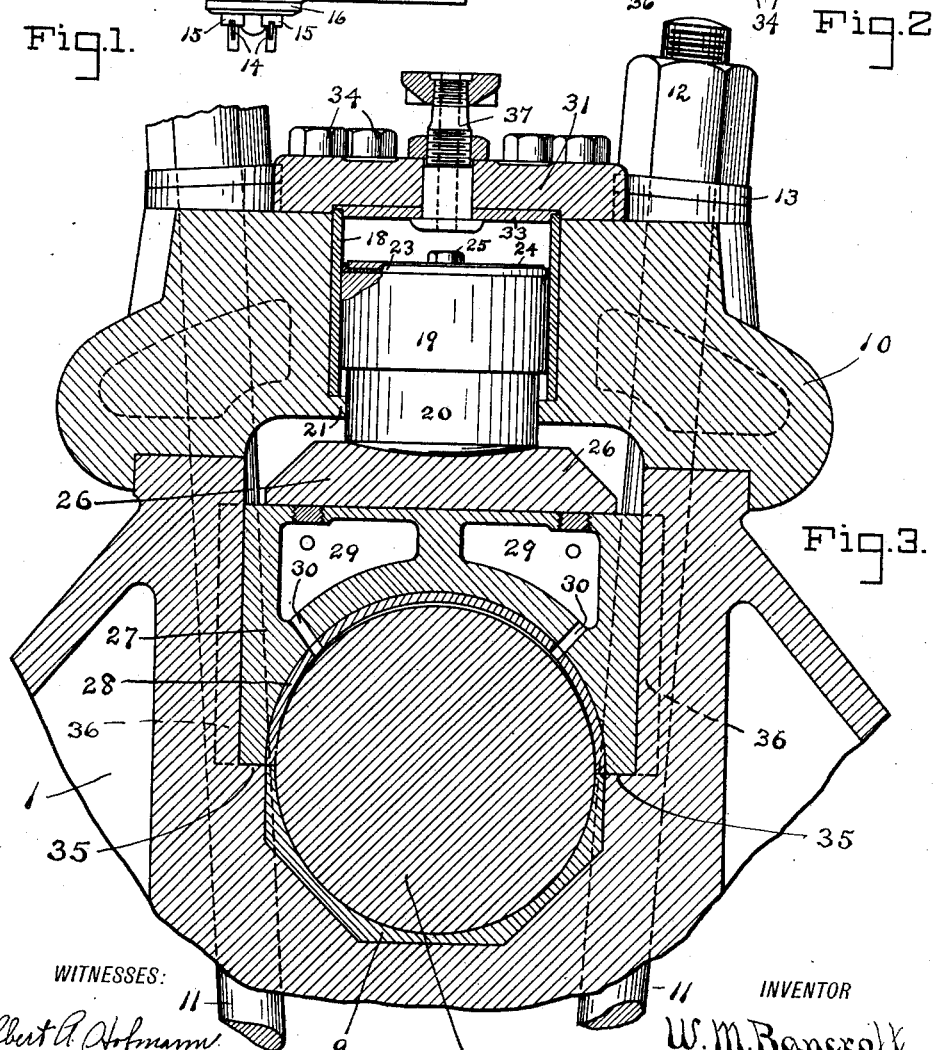

In the accompanying drawing, Figure 1 is a side elevation of a sugar-cane mill. Fig. 2 is a plan of a cap for the top bearings of this mill, on a larger scale. Fig. 3 is a section on the line 3—3 of Fig. 2 on a still larger scale.

Similar reference characters refer to like parts throughout the several views.

The mill shown in the drawings is of the same general type as shown in my prior Patent No. 1,023,355, dated April 16th, 1912, and has frames 1, a bed 2, caps 3 for the lower roll bearings, shafts 4 for the lower rolls 5, and quarter-boxes or bearings 6 for these shafts. The mill also has an upper roll 7, a shaft 8 therefor, and lower bearings 9 for this shaft.

The upper cap 10, preferably of cast-steel, is formed with holes for the bolts 11 which have nuts 12 and washers 13 at their upper ends. The lower ends of the bolts are preferably formed with slots to receive the keys 14 which bear against the washers 15 and the plate 16. By the use of four of these heavy steel bolts, preferably from four to five inches in diameter, an upward thrust of from three to four hundred tons can be resisted by each cap with safety.

The cap 10 is shown bored and furnished with a cylindrical liner 18, preferably of bronze, to form the cylinder to receive the hydraulic piston 19, which has a reduced portion 20 guided by the internal flange 21 of the cap. A packing washer 23 of leather is held in place by the plate 24 and bolt 25. The piston engages the steel pressure plate 26 which rests on the bearing 27, preferably of semi-steel, and provided with an anti-friction metal liner 28. This bearing is preferably formed with pockets 29 and passages 30 for lubricants. A cylinder head 31, preferably of steel, having a bearing plate 33 of bronze, is held in place by the bolts 34.

It will be clear from Fig. 3 that the frame is so constructed that the bearings 27 rest against the shoulders 35 when the shaft of the upper roll rests in the lower bearings 9, which occurs when no cane is passing through, and that the upper bearing is entirely free from the shaft, the opening between the bearings being of greater diameter than the shaft. This is of the utmost importance, for the normal downward pressure of the piston on the plate 26 and bearing 27 is too great when transmitted to the shaft by the bearing to permit the lubricants to flow between the bearings and shaft. As a result, the shaft soon runs dry unless the pressure is released. This is usually accomplished by relieving the hydraulic pressure on the bearing, the supply of cane to the mill being stopped during the time that this pressure is reduced. This causes serious delays in the operation of the mill.

By forming the shoulders 35 on the frames and by forming the bearing 27 of such width that it may rest on these shoulders, and of such height that when it rests on the shoulders and the shaft rests on the lower bearing 9, a space is left between the shaft and the upper bearing, as indicated in the drawing, lubricant can flow freely through the passages 30 onto the shaft.

It is unnecessary to reduce the hydraulic pressure, for the pressure is resisted by the shoulders 35. The person in charge of the feeding of the cane to the mill will interrupt the stream of cane for a few seconds at predetermined intervals of time so that the upper roll and its shaft may descend to their lowest level.

It will be understood that the bearings 27 may be provided with flanges 36 to hold them from moving endwise, and that any desired coupling 37 may be employed to connect the hydraulic cylinder to the pressure tank. While this improved bearing is shown provided with a self-contained hydraulic cylinder and piston, it will be understood that any other desired fluid-pressure device may be employed to transmit force to one of the bearings of a shaft, which bearing will be limited in its movement by shoulders formed on the frame that guides the bearing.

I claim—

1. In a bearing for a mill roll shaft which has a periodic upward movement under the stress of the material passing through the mill, the combination of a frame, a lower bearing for said mill roll shaft rigidly mounted in the frame, an upper bearing for said shaft vertically slidable in the frame and provided with passages to convey lubricants to the shaft, a hydraulic means for transmitting pressure to said upper bearing, said frame being formed with shoulders so positioned that when the upper bearing contacts therewith an opening is formed between the bearings of greater height than the diameter of the shaft, so that when the shaft rests on the lower bearing while no materials are passing through the mill, the upper bearing is held a sufficient distance from the shaft to permit lubricants to flow into the space above the shaft.

2. In a mill roll shaft which has a periodic upward movement under the stress of materials passing through the mill, the combination of a frame, a lower bearing for said mill roll shaft mounted therein, an upper bearing for said shaft vertically slidable in the frame and provided with passages to convey lubricants to the shaft, a cap for said bearing bored to constitute a hydraulic cylinder, a piston in said bore, a plate between the piston and said upper bearing, said frame being formed with shoulders so positioned that when the upper bearing contacts with the shoulders, an opening is formed between the bearings of greater height than the diameter of the shaft, so that when the shaft rests on the lower bearing while no materials are passing through the mill, the upper bearing is held a sufficient distance from the shaft to permit lubricants to flow into the space above the shaft.

3. In a bearing for a mill roll shaft which has a periodic upward movement under the stress of the materials passing through the mill, the combination of a frame, a lower bearing for said mill roll shaft mounted therein, an upper bearing for said shaft vertically slidable in the frame and provided with oil pockets and passages leading from the pockets to the upper part of the wearing surface of the bearing to convey lubricants to the shaft, a cap for said bearing bored to constitute a hydraulic cylinder, a piston in said bore, a plate between the piston and said upper bearing, said frame being formed with shoulders so positioned that when the upper bearing contacts therewith, an opening is formed between the bearings of greater diameter in line with said piston than at right angles thereto, so that when the shaft rests on the lower bearing while no materials are passing through the mill, the upper bearing is held a sufficient distance from the shaft to permit lubricants to flow into the space above the shaft.

In testimony whereof I have signed this specification in the presence of two subscribing witnesses.

W. M. BANCROFT.

Witnesses:
L. EMILE ARNOT,
MARINVILLE J. GUERIN, Jr.